(12) United States Patent
Albert et al.

(10) Patent No.: US 12,195,595 B2
(45) Date of Patent: Jan. 14, 2025

(54) HYDROPHOBIZING AGENT HAVING A PERMANENT EFFECT

(71) Applicant: Rudolf GmbH, Geretsried (DE)

(72) Inventors: Christine Albert, Bruckmuehl (DE); Maximilian Schubert, Wolfratshausen (DE); Pauline Hornung, Munich (DE); Dirk Sielemann, Wolfratshausen (DE)

( * ) Notice: Subject to any disclaimer, the term of this patent is extended or adjusted under 35 U.S.C. 154(b) by 0 days.

(21) Appl. No.: 18/256,133

(22) PCT Filed: Feb. 24, 2022

(86) PCT No.: PCT/EP2022/054604
§ 371 (c)(1),
(2) Date: Jun. 6, 2023

(87) PCT Pub. No.: WO2022/180142
PCT Pub. Date: Sep. 1, 2022

(65) Prior Publication Data
US 2024/0034840 A1    Feb. 1, 2024

(30) Foreign Application Priority Data
Feb. 26, 2021   (EP) .................................... 21159608

(51) Int. Cl.
*C08G 77/26* (2006.01)
*D06N 3/00* (2006.01)
*D06N 3/12* (2006.01)

(52) U.S. Cl.
CPC .......... *C08G 77/26* (2013.01); *D06N 3/0006* (2013.01); *D06N 3/0036* (2013.01); *D06N 3/009* (2013.01); *D06N 3/128* (2013.01); *D06N 2201/02* (2013.01); *D06N 2201/042* (2013.01); *D06N 2209/067* (2013.01)

(58) Field of Classification Search
CPC ....... C08G 77/388; C08L 83/08; D06N 3/128; D06M 15/564; D06M 15/643
See application file for complete search history.

(56) References Cited

U.S. PATENT DOCUMENTS

| | | | | |
|---|---|---|---|---|
| 3,671,562 A * | 6/1972 | Pepe | ...................... | C08G 77/26 556/416 |
| 4,626,560 A * | 12/1986 | Marsden | ................. | C04B 24/42 523/213 |
| 8,703,894 B2 * | 4/2014 | Duschek | ............. | D06M 13/395 528/26 |
| 10,822,500 B2 * | 11/2020 | Glas | ....................... | C08G 18/10 |
| 2020/0332148 A1 | 10/2020 | Gotou et al. | | |

FOREIGN PATENT DOCUMENTS

| | | |
|---|---|---|
| EP | 0169992 A1 | 2/1986 |
| EP | 1136513 B1 | 1/2006 |
| EP | 3733809 A1 | 11/2020 |
| KR | 20170028205 A | 3/2017 |
| WO | 8606073 A1 | 10/1986 |
| WO | 9740103 A1 | 10/1997 |
| WO | 2008135208 A1 | 11/2008 |
| WO | 2015191326 A1 | 12/2015 |
| WO | 2018110667 A1 | 6/2018 |

* cited by examiner

*Primary Examiner* — Margaret G Moore
(74) *Attorney, Agent, or Firm* — Agris & von Natzmer LLP; Joyce von Natzmer

(57) ABSTRACT

The invention relates to organopolysiloxanes comprising at least one structural unit with at least one $C_{8-28}$ alkyl group and at least one urea group, a method for their preparation, a preparation comprising the organopolysiloxane, and the use as a hydrophobizing agent.

22 Claims, No Drawings

HYDROPHOBIZING AGENT HAVING A PERMANENT EFFECT

CROSS-REFERENCE TO RELATED APPLICATIONS

This is the U.S. national stage of international patent application no. PCT/EP2022/054604, filed Feb. 24, 2022 designating the United States and claiming priority to European patent application no. EP 21159608.5, filed Feb. 26, 2021, which is incorporated herein by reference in its entirety.

FIELD OF THE INVENTION

The invention relates to organopolysiloxanes comprising at least one structural unit with at least one $C_{8-28}$ alkyl group and at least one urea group, a process for their preparation, a preparation comprising the organopolysiloxane, and their use as hydrophobizing agents.

BACKGROUND AND INTRODUCTION TO THE INVENTION

In order to make a sheet material water repellent or oil repellent, water-based or solvent-based preparations of silicone oils, kerosene, fluorocarbon polymers and other additives are commonly used to meet the strains caused by rain and splash water during the use of the sheet material.

While the creation of water-repellent effects with products based on kerosenes and silicones only results in hydrophobicity, fluorocarbon polymers (FC polymers) additionally result in dirt and oil repellency.

Despite the good overall effect of FC polymers, the hydrophobic and oleophobic effect is greatly reduced after washing processes due to the disorientation of the active fluorocarbon residues in the polymer molecules, unless reorientation takes place by thermal treatment.

This means that fabrics treated in this way, and in particular textiles after washing, must be subjected to heat treatment in order to reactivate the desired effects. This heat treatment is hereinafter referred to as "reactivation".

Furthermore, preparations based on fluorocarbon polymers are expensive—due, among other things, to energy-intensive production—and are also suspected of being eco- and human-toxic, so that their use is increasingly viewed critically, especially in the clothing sector. Therefore, there is a search for alternative fluorine-free products having comparable property profiles, whereby not only good initial hydrophobicity but also resistance of the finish to repeated washing is an important quality feature.

In EP 3 733 809 A1, preparations based on amino-modified silicones, organopolysiloxanes with a three-dimensional structure and alkylpolysiloxanes are used to achieve water-repellent effects on textile materials.

WO 2018/110667 describes compositions for hydrophobizing substrates comprising a polymer composed of non-fluorinated (meth)acrylate residues and silicone macromers.

From WO 2008/135208, fluorocarbon-free preparations based on hydrophobic reaction products and organopolysiloxanes containing $C_8$-$C_{28}$ alkyl groups are known.

In WO 2015/191326, compositions comprising a urethane-based compound in addition to a wax are disclosed for hydrophobizing substrates. The wax can be, for example, a natural or synthetic wax or mixtures thereof.

The preparations can be used to achieve good water-repellent effects, but usually relatively high application amounts are required, which reduces the breathability of the finished textile. Furthermore, similar to textiles treated with fluorocarbon-containing preparations, thermal treatment (reactivation), e.g. in a tumble dryer or by ironing, must be carried out after washing in order to regain the original effect level.

SUMMARY OF THE INVENTION

It is therefore the task of the present invention to provide a compound and composition that enable good and permanent hydrophobic effects even at low application rates without the need for reactivation (LAD effect, "Laundry/Air Dry", M. Rasch et al., Melliand Textilberichte June 2005, pp. 456-459).

Surprisingly, the task could be solved by an organopolysiloxane comprising at least one structural unit with at least one long-chain alkyl group and at least one urea group. Moreover, the effect could be enhanced in the preparations according to the invention comprising an organopolysiloxane according to the present invention. Even small application amounts of the organopolysiloxane according to the present invention cause excellent hydrophobicity on the substrate. Furthermore, the compositions according to the present invention cause excellent adhesion to the substrate, so that the effect level hardly changes over time (effect permanence) and can also be maintained when used, e.g. by abrasion, washing, etc.

Surprisingly, it has also been shown that the effect level can be kept constant even without reactivation measures (LAD effect).

It has further been shown that flame retardant fibers, such as Trevira CS and textiles made therefrom, do not lose their flame retardancy even after application of the compound or preparation according to the present invention, although flame retardancy generally deteriorates by application of an FC-free hydrophobizing agent.

In one aspect, the present invention relates to an organopolysiloxane comprising at least one structural unit (i) and/or (vi):

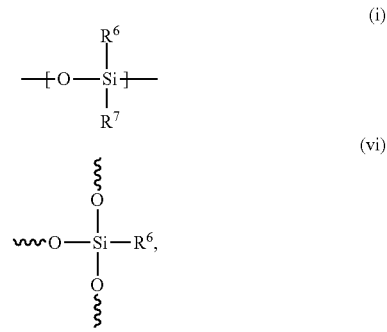

wherein
$R^6$ independently from each other comprises at least one $C_{8-28}$ alkyl group, preferably $C_{14-20}$ alkyl group, more preferably $C_{16-18}$ alkyl group, and at least one urea group, and
$R^7$ is independently selected from —$CH_3$, —OH, and a —$C_{1-5}$ alkoxy group, preferably —$CH_3$.

$R^6$ preferably comprises at least one $C_8$-28 alkyl urea group according to the present formula:

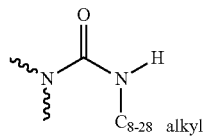

more preferably $R^6$ comprises at least one $C_{14\text{-}20}$ alkyl urea group, even more preferably a $C_{16}$-18 alkyl urea group.

In a preferred embodiment $R^6$ is a formula selected from

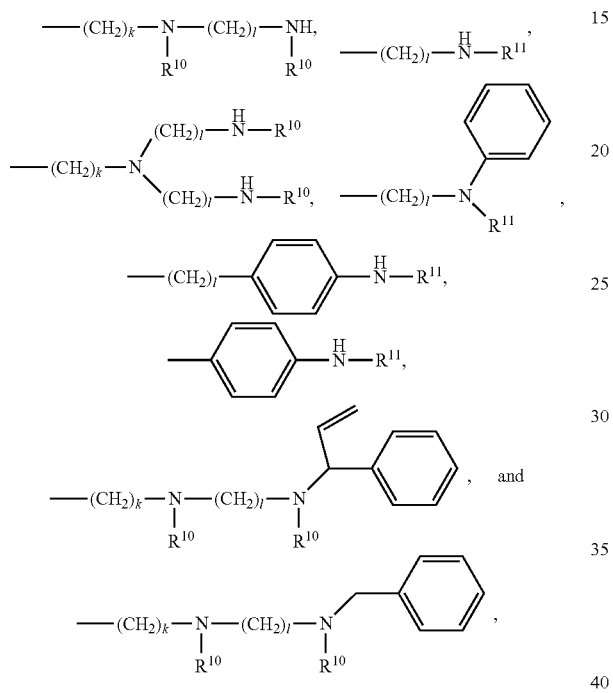

wherein $R^{10}$ independently from each other is H or $R^{11}$, $R^{11}$ independently from each other is —C(O)—NH—$C_{8\text{-}28}$ alkyl, more preferably —C(O)—NH—$C_{14\text{-}20}$ alkyl, even more preferably —C(O)—NH—$C_{16\text{-}18}$ alkyl, provided that $R^6$ comprises at least one $R^{11}$ k is 2-4, preferably 2-3 and l is 2-4, preferably 2-3.

Further, the organopolysiloxane according to the present invention can comprise at least one structural unit selected from (ii)
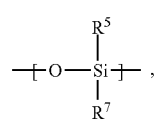

(iii)
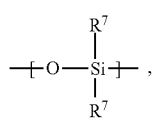

(iv)
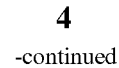

(v)
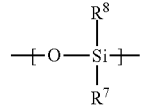

(vii)
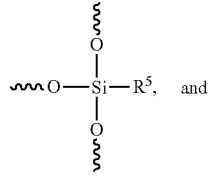

wherein $R^5$ independently from each other is a $C_{8\text{-}28}$ alkyl group, preferably $C_{14\text{-}20}$ alkyl group, more preferably $C_{16\text{-}18}$ alkyl group, $R^8$ independently from each other is selected from (α)
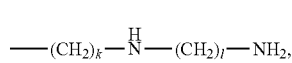

(β)
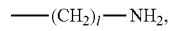

(γ)
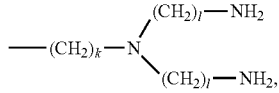

(δ)

(ε)
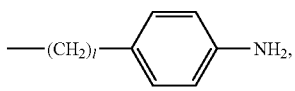

(ζ)
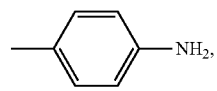

(η)

(θ)
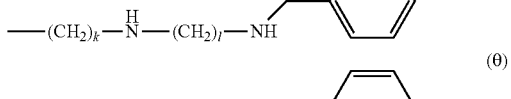

$R^6$ and $R^7$, k and l are as defined above.

Preferably, the organopolysiloxane has independently from each other the following end groups:

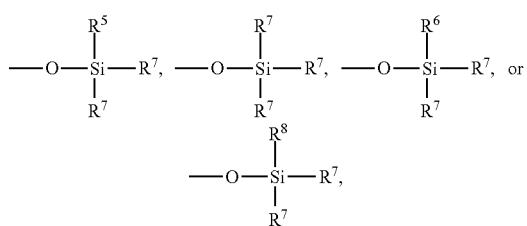

wherein
$R^5$, $R^6$, $R^7$ and $R^8$ are as defined above.

In a preferred embodiment, the molar portion of structural unit (i) in the organopolysiloxane is in the range of 25-100 mol-%, more preferably 50-100 mol-%, provided that all structural units in the organopolysiloxane total 100 mol-%.

Furthermore, the molar content of structural unit (vi) is preferably in the range of 25-100 mol-%, more preferably 50-100 mol-%.

In another embodiment, the molar portion of structural unit (ii) in the organopolysiloxane is in the range of 0-50 mol-%, more preferably 0-30 mol-%.

The molar portion of the structural unit (iii) may be in the range of 0-40 mol-%, more preferably 0-20 mol-% in the organopolysiloxane.

The molar portion of the structural unit (iv) and/or (vii) is preferably in the range of 0-20 mol-%, more preferably 0-10 mol-%.

In one embodiment, the molar portion of the structural unit (v) is in the range of 0-50 mol-%, more preferably 0-30 mol-%.

The organopolysiloxane according to the present invention preferably has a total (protonatable) basic nitrogen content of 0-3 wt %, preferably 0-1.5 wt %, even more preferably 0.01-0.05 wt %. The titration for determining the basic nitrogen content is known to the person skilled in the art.

In another aspect, the present invention relates to a process for preparing an organopolysiloxane according to the present invention, comprising the steps
a) providing an organopolysiloxane and/or alkoxysilane having NCO-reactive primary and/or secondary amine groups,
b) reacting the organopolysiloxane and/or alkoxysilane according to a) with $C_{8-28}$ alkyl isocyanate; and
c) optionally hydrolyzing/condensing the alkoxysilane obtained in step b) to the organopolysiloxane.

More particularly, the present invention relates to a method for preparing an organopolysiloxane comprising the steps
a') providing an organopolysiloxane with NCO-reactive primary and/or secondary amine groups and
b') reacting the organopolysiloxane according to a') with $C_8$-28 alkyl isocyanate, preferably $C_{14-20}$ alkyl isocyanate, more preferably $C_{16-18}$ alkyl isocyanate.
Alternatively or additionally, the method may comprise:
(a") providing an alkoxysilane having NCO-reactive primary and/or secondary amine groups,
b") reacting the alkoxysilane according to a") with $C_8$-28 alkyl isocyanate, and
c") hydrolysis/condensation of the alkoxysilane obtained in step b") to the organopolysiloxane.

The organopolysiloxane according to step a') can be obtained by equilibration in the presence of ($C_{1-5}$ alkoxy) silanes having at least one NCO-reactive primary and/or secondary amine group. The equilibration reaction is preferably base-catalyzed and is described, for example, in EP 1 136 513 B1, Example 1. Organooligosiloxanes or organopolysiloxanes together with alkoxysilanes having at least one NCO-reactive primary and/or secondary amine group can be used as reactants in the equilibration reaction. Preferably, the equilibration is carried out in the presence of an organopolysiloxane containing structural units (ii), (iii), and/or (v), preferably in the presence of metal hydroxide and water.

Alternatively, organopolysiloxanes can be obtained by hydrolysis and condensation of alkoxysilanes having at least one NCO-reactive primary and/or secondary amine group. Alkoxysilanes may further be present in the hydrolysis reaction resulting in structural units (ii), (iii) and/or (v). In order to shift the equilibrium in the hydrolysis to the product side, the alcohol formed can be distilled off, if necessary under reduced pressure.

In the method according to the present invention, the alkoxysilane in step a") is preferably a ($C_{1-5}$ alkoxy)silane having at least one NCO-reactive primary and/or secondary amine group, more preferably selected from

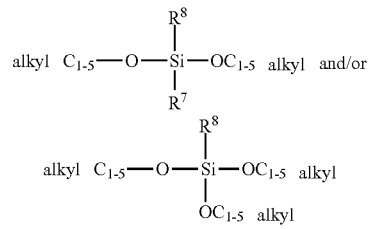

wherein $R^7$ and $R^8$ are as defined above.

The reaction according to step b') and b") between the linear or branched $C_{8-28}$ alkyl isocyanate and the NCO-reactive primary and/or secondary amine group is preferably carried out in such a way that the alkyl isocyanate is added to the amino groups with stirring. In this case, the reaction can be carried out in substance but also in solvent, such as ethyl acetate, isopropyl acetate, acetone, tetrahydrofuran, methyl ethyl ketone, methyl propyl ketone, toluene, xylene, dipropylene glycol dimethyl ether, methoxypropyl acetate, etc. To accelerate the reaction, the reaction mixture can be tempered at 40-140° C., if necessary. As a catalyst, in particular, di-n-butyltin dilaurate, tin(II) octoate, dibutyltin diacetate, potassium octoate, zinc dilaurate, bismuth trilaurate or tertiary amines, such as 1,4-diazabicyclo[2.2.2]octane, dimethylcyclohexylamine, dimethylaminopropyl dipropanolamine, pentamethyl dipropylene triamine, N-methylimidazole or N-ethylmorpholine are considered.

The molar stoichiometry between $C_{8-28}$ alkyl isocyanate and NCO-reactive primary or secondary amine groups is preferably chosen such that 50-100 mol-%, preferably 80-100 mol-%, particularly preferably 90-100 mol-% of the amino groups react with the NCO groups of the $C_{8-28}$ alkyl isocyanate. Therefore, in a non-stoichiometric reaction, protonatable amino groups remain in the organopolysiloxane. The protonable basic nitrogen content is between 0-3 wt % (see above).

Step c") is preferably carried out in the presence of a catalyst, preferably KOH, NaOH, optionally at elevated temperature, e.g. 40-140° C.

In step c") the alkoxysilane obtained after step b") is hydrolyzed and subsequently condensed. Alkoxysilanes may further be present in the hydrolysis reaction, resulting in structural units (ii), (iii) and/or (v). To shift the equilibrium in the hydrolysis to the product side, the resulting alcohol may be distilled off/condensed, if necessary under reduced pressure.

In a further aspect, the present invention relates to an organopolysiloxane obtainable by the process according to the present invention.

In a further aspect, the invention relates to a preparation comprising (1) at least one reaction product(S) obtainable by reacting at least one compound (A) of formula (I)

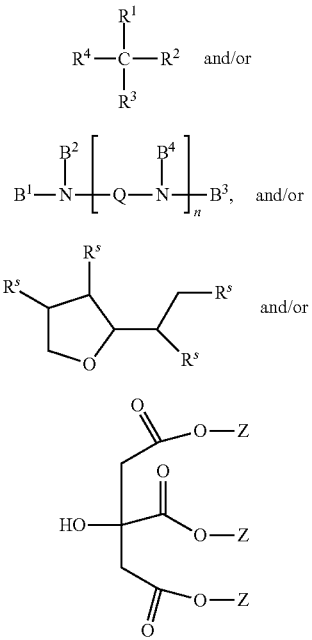

and/or formula (II)

$B^1$—N—[—Q—N—]$_n$—$B^3$, and/or formula (III)

and/or

Formula (IV)

wherein $R^1$=—X—Y—Z or —Z, wherein

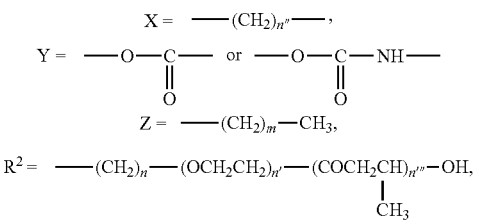

$R^3$=—X—Y—Z, —Z or —Y—Z provided that in case of the meaning of —Y—Z in the residue $R^2$ n is replaced by n",
$R^4$=—X—Y—Z or —(CH$_2$)$_n$·H,
$B^1$=—V—W—Z or —Z,
wherein

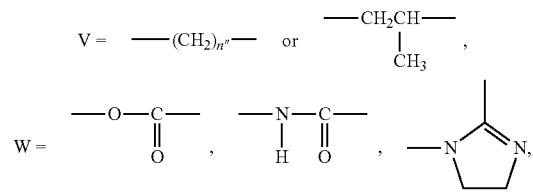

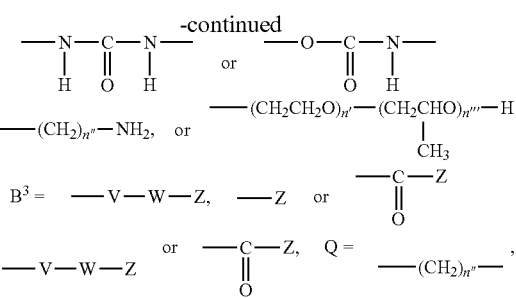

$B^2$ = —(CH$_2$)$_{n''}$—NH$_2$, or $B^3$ = —V—W—Z, —Z or

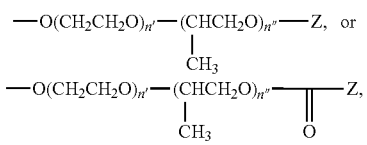

$B^4$ = —V—W—Z or —C—Z, Q = —(CH$_2$)$_{n''}$—, $R^s$ independently from each other is —OH, —YZ, —O(CH$_2$CH$_2$O)$_{n'}$—(CHCH$_2$O)$_{n''}$—Z, or
            |
            CH$_3$ —O(CH$_2$CH$_2$O)$_{n'}$—(CHCH$_2$O)$_{n''}$—C—Z,
            |                    ||
            CH$_3$                 O provided that at least one residue $R^s$ in formula (III) is an OH group, and n, n', n", n'" and m independently from each other is an integer, wherein
n=0-2,
n'=0-4,
n"=1-4,
n'"=0-4 and
m=8-30, preferably 12-26, more preferably 14-22,
with at least one non-blocked or at least one partially blocked di-, tri- or polyisocyanate (IC), wherein the portion of free isocyanate (NCO) groups in the polyisocyanate (IC) is between 1.8 and 10 per mol (2) at least one organopolysiloxane according to the present invention,
(3) optionally at least one non-blocked or at least partially blocked di-, tri- or polyisocyanate (IC),
(4) optionally at least one liquid medium, in particular water or an organic solvent, and
(5) optionally at least one emulsifier.

The preparation according to the present invention is preferably free of fluorine compounds.

The preparation is preferably in the form of a dispersion, preferably in the form of an aqueous dispersion. In this case, the solids content of the dispersion is preferably 10-40 wt %, more preferably 15-30 wt %.

The reaction product (S) is preferably hydrophobic. The term "hydrophobic" as used in the present invention defines compounds that typically do not substantially dissolve in water at 20° C. Saturated solutions of the "hydrophobic" reaction products (S) preferably contain up to 1 g of dissolved compound per liter of water (20° C.), more preferably up to 0.5 g/l, even more preferably up to 0.2 g/l.

The reaction product (S) is obtainable by reacting at least one compound (A) with at least one non-blocked or at least partially blocked di-, tri- or polyisocyanate (IC).

Compound (A) of the formula (I) is preferably obtained by reacting polyhydric alcohols (a1) with carboxylic acids (b1) or with alkyl isocyanates (b2). Preferred examples of polyhydric alcohols (a1) are glycerol, trimethylolethane, trimethylolpropane, 1,2,4-butanetriol, pentaerythritol or sugars such as glucose, preferably glycerol, trimethylolethane, trimethylolpropane, 1,2,4-butanetriol and/or pentaerythritol, more preferably glycerol.

Compound (A) of formula (II) is preferably obtained by reacting alkanolamine (a2) and/or alkylamine (a3) with carboxylic acid (b1) and/or alkyl isocyanate (b2). Preferred alkanolamines (a2) are 2-amino-2,3-propanediol, 2-amino-2-nnethyl-1,3-propanediol, diethanolamine, dipropanolamine, diisopropanolamine, ethanolpropanolamine, triethanolamine, triisopropanolamine, N,N,N',N'-tetrakis(2-hydroxypropyl)ethylenediamine, aminoethylethanolamine, aminopropylethanolamine, alkyltris(hydroxyethyl)propylenediamine, and alkyldihydroxy-ethylamine with preferably 12-24 carbon atoms in the alkyl radical, as well as their ethoxylation products. Diethanolamine, diisopropanolamine, triethanolamine, triisopropanolamine, aminoethylethanolamine and aminopropylethanolamine are particularly preferred, more preferably triethanolamine.

Examples of alkylamines (a3) are bis(aminoethyl)amine, bis(aminopropyl)amine and their polymeric homologs, aminoethylimminopropylamine, bis(aminopropyl)ethylenediamine, tris(amino-ethyl)amine, tris(aminopropyl)amine, trisaminononane, aminopropylstearylamine and aminopropylbisstearylamine. In this context, bis(aminoethyl)amine, bis(aminopropyl)amine, aminoethylaminopropylamine, bis(aminopropyl)ethylenediamine and aminopropylstearylamine are preferred, in particular bis(aminoethyl)amine.

The carboxylic acids (b1) used to prepare compound (A) may be saturated, unsaturated, unbranched or branched and preferably have 10-32 carbon atoms, more preferably 12-24 carbon atoms. Preferably, unbranched, saturated carboxylic acids with preferably 10-32 carbon atoms, more preferably 12-24 carbon atoms, such as capric, undecanoic, lauric, myristic, palmitic, stearic, arachic and behenic acids, are used. Lauric, palmitic, stearic and behenic acids are particularly preferred.

The alkyl isocyanates (b2) used for the preparation of formula (I) and (II) are preferably unbranched, the alkyl radical preferably having 9-31, in particular 11-23 carbon atoms. A particularly preferred alkyl isocyanate is stearyl isocyanate.

Instead of the compound (A) prepared using the polyhydric alcohols (a1) or the alkanolamines (a2) or the alkylamines (a3) and the carboxylic acids (b1) or the alkyl isocyanates (b2), compounds having one active hydrogen atom and two hydrophobic radicals, such as Guerbet alcohols, bis (dodecyl)amine and preferably bis(octadecyl)amine, can also be used.

Compounds of formula (III) are sorbitan esters obtained by reaction of sorbitol with $C_{10}$-$C_{32}$ carboxylic acids, preferably with $C_{14}$-$C_{28}$ carboxylic acids particularly preferably with $C_{16}$-$C_{24}$ carboxylic acids by dehydration. Depending on the stoichiometry, mono-, di- or triesters as well as mixtures of these can be formed. If necessary, alkoxylated derivatives can also be used. For the reaction with the non-blocked or at least partially blocked di-, tri-, or polyisocyanate (IC), it is necessary that at least one reactive OH group is present in the sorbitan ester. Furthermore, it is possible to react 1,4-sorbitan hydride with $C_{10}$-$C_{32}$ alkyl isocyanates, preferably with $C_{14}$-$C_{28}$ alkyl isocyanates, particularly preferably with $C_{16}$-$C_{24}$ alkyl isocyanates, to give compounds of formula (III).

Compounds of formula (IV) are alkyl citrates obtained by esterification of citric acid with long-chain $C_{10}$-$C_{32}$ alcohols, preferably with $C_{14}$-$C_{28}$ alcohols, particularly preferably with $C_{16}$-$C_{24}$ alcohols.

At least one compound (A) is reacted with at least one non-blocked or at least partially blocked di-, tri-, or polyisocyanate (IC) to form the hydrophobic reaction product (S), the proportion of free isocyanate (NCO) groups in the polyisocyanate (IC) being between 1.8 and 10 per mole. Examples of non-blocked or partially blocked isocyanates are described in DE 100 17 651 A1, paragraphs [0032]-[0037].

Particularly preferred non-blocked di-, tri- or polyisocyanates (IC) are, for example, 2,4-toluylene diisocyanate, 2,4'-diphenylmethane diisocyanate, 4,4'-diphenylmethane diisocyanate (MDI), higher-chain homologs of diphenylmethane diisocyanate (polymer MDI), 4-methyl-cyclohexane-1, 3-diisocyanate, tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate, dimer diisocyanate, mixtures such as mixtures of MDI and hexamethylene diisocyanate, mixtures, such as mixtures of MDI and polymeric MDI, and derivatives thereof. Dimer diisocyanate is available from Cognis Corp, 300 Brookside Avenue, Ambler, PA 19002, USA, under the designation DDI 1410.

Derivatives of isocyanates (IC) comprise, for example, cyclized oligo- or polyisocyanates. The preparation of cyclized oligo- or polyisocyanates can be carried out by the known methods of cyclization according to W. Siefken (Liebigs Annalen der Chemie 562, 1949, pp. 75-136), where the oligo- or polyisocyanates may be open-chain or cyclic. Such derivatives can be prepared from the above di-, tri- and polyisocyanates by linkage using urethane, allophanate, urea, biuret, uretdione, amide, isocyanurate, carbodiimide, uretonimine, oxadiazine trione or iminoxadiazinedione structures. Hexamethylene diisocyanate trimers, diphenylmethane diisocyanate trimers and urethanes of 2,4-toluylene diisocyanate, which still have free NCO groups, are preferably used.

It is also possible to derivatize partial amounts of the isocyanate groups with polyalkoxymonoalkyl ethers by use of appropriate catalyst systems to form urethanes in order to improve the emulsifiability of component (1) in water. Here, polyethylene glycol monomethyl ethers with preferably 4-20 ethylene oxide units, optionally with additional 2-6 propylene oxide units, can be used. As catalysts, systems known to the person skilled in the art based on tertiary amines and/or organotin compounds, such as dibutyltin dilaurate, dioctyltin dilaurate or diacetate, can be used.

Preferred derivatives are hexamethylene diisocyanate trimers, diphenylmethane diisocyanate trimers, urethanes of 2,4-toluylene diisocyanate with free NCO groups, and di-, tri- or polyisocyanate modified with polyalkoxymonoalkyl ether (IC), in particular di-, tri- or polyisocyanate modified with polyethylene oxide monoalkyl ether.

As an alternative to isocyanates modified by polyalkoxymonoalkyl ethers, tertiary alkanolamines can be used as additives to improve the cationic charge of the reaction products (S) and thus the self-emulsifying properties without impairing the overall properties. Dimethylaminoethanol is particularly suitable for this purpose.

The isocyanate (IC) may further be partially or completely blocked (see, for example, DE 100 17 651 A1, paragraph [0042]). Preferred blocking agents are sodium bisulfite, methyl ethyl ketoxime, 3,5-dimethyl pyrazole, N-tert-butylbenzylamine, in particular 3,5-dimethyl pyrazole.

The blocking is carried out by reacting di-, tri- or polyisocyanate (IC) with the blocking agent in the melt or in an organic solvent (LM) inert to isocyanates, preferably under an inert gas atmosphere and in the presence of a suitable catalyst, as described for example in EP0159117B1 or DE4441418A1.

The molar ratio of the free NCO groups of the di-, tri- or polyisocyanates (IC) to be blocked to the reactive groups of the blocking agent is preferably in a stoichiometric excess up to 2:1, preferably up to 3:1.

To prepare the reaction product (S), the molar ratio of free isocyanate (NCO) groups in the polyisocyanate (IC) to isocyanate-reactive groups in compound (A) is adjusted to 1:1 to 1:1.3, preferably 1 to 1.1. The isocyanate-reactive groups in compound (A) are preferably hydroxy groups, primary and/or secondary amino groups.

In a preferred embodiment, the preparation contains component (1) at 10-90 wt %, more preferably 20-80 wt %, even more preferably 25-65 wt %, based on the total mass of components (1) and (2).

The component (2) used is the organopolysiloxane (2) according to the present invention, which is described in detail above.

In one embodiment, component (2) accounts for 10-90 wt %, preferably 20-80 wt %, more preferably 30-70 wt %, based on the total mass of components (1) and (2).

The addition of component (3) in the preparations (Z) according to the present invention is optional. The non-blocked di-, tri- or polyisocyanates (IC) suitable for component (3) are already described above in the preparation of the reaction product (S) in component (1). Compounds of this type are called boosters and they cause an improvement of water repellency on the treated sheet structures. At the same time, due to the polyfunctionality of the polyisocyanate, crosslinking with the —OH, —COOH or —NH$_2$ groups always present on most substrates and unreacted functional groups of component (1) is brought about, which significantly improves resistance to washing processes and increases resistance to abrasion.

Component (3) can be used in both non-blocked and blocked forms. The non-blocked forms of component (3) are mainly used in applications involving non-polar media, because this avoids an undesirable, premature reaction of the free NCO groups with the reactive active hydrogen atoms of the application medium.

If the component (3) is to be applied from application media to sheet structures carrying NCO-reactive groups, it is often necessary to protect these by blocking with suitable blocking agents. In these cases, component (3) is prepared by procmethods in which the free NCO groups of di-, tri- or polyisocyanates are completely blocked with a blocking agent and optionally in an organic solvent. To achieve complete blocking, a small stoichiometric excess of blocking agent is usually used. If products for aqueous applications are to be prepared, the blocked di-, tri- or polyisocyanates, optionally dissolved in organic solvent, must be converted into emulsion form by use of suitable emulsifiers (=component (5)).

Examples of suitable customary and known blocking agents are known from DE-A-100 17 651 A1, paragraph 0042, and are already described in the description of the preparation of the conversion product (S) in component (1).

In a particular embodiment, non-blocked di-, tri- or polyisocyanates whose self-emulsifying ability in water is improved by partial reaction of the isocyanate groups with polyalkoxymonoalkyl ethers with the aid of appropriate catalyst systems to form urethanes can be used as boosters. By attaching hydrophilic side chains to the di-, tri- or polyisocyanates, the HLB value of the urethane prepared in this way is changed so favorably that the compound, which is insoluble in water per se, acquires self-emulsifying properties. In the case of the hydrophilic side chains, a certain selection of the type and amount of the residue is advantageous. Preferably, between 4 and 20 ethylene oxide radicals are used, optionally together with 2-6 propylene oxide radicals, although these can also be present in blocks within the alkoxy chain. In the case of such mixed alkoxylated side chains, however, the amount of ethylene oxide always outweighs that of the propylene oxide. Systems known to those skilled in the art based on tertiary amines and/or organotin compounds, such as dibutyltin dilaurate, dioctyltin dilaurate or diacetate, can be used as catalysts for urethane synthesis.

During application, the urethanes prepared in this way spontaneously form fine-particle emulsions with high stability to shear forces and good compatibility with the other components of an application liquor when introduced into water. Due to the reactivity of the remaining, unreacted NCO groups with water, only limited pot lives up to a maximum of 8 hours are possible with these special forms in the application liquor.

Component (3) is added especially in cases where particularly high demands apply to the washing resistance of the treated fabrics.

Preferably, 0-50 wt %, preferably 1-35 wt %, more preferably 5-35 wt %, of component (3) is used based on the total mass of components (1), (2) and (3). Component (3) can also be used directly from solvent containing anhydrous media without formulation aids.

Preferably, 5-35% of component (3) is used, which can be used directly and without formulation aids for application from solvent-containing, water-free media. If the application is made from aqueous media, emulsions of component (3) with 15-35 wt % of solids content are preferably used, which are prepared by use of emulsifiers (=component (5)) based on ethoxylated fatty amines, optionally in quaternary form, and optionally other emulsifying auxiliaries, such as solubilizers based on ethylene glycol, propylene glycol, dipropylene glycol, dipropylene glycol monomethyl ether, mono- or diethylene glycol monobutyl ether or n-methylpyrrolidone. Emulsification can be carried out with the aid of high-pressure homogenizing machines.

Component (4) is optional. The liquid medium is preferably water or an organic solvent. Inert solvents, such as esters, e.g. ethyl lactate, n-propyl acetate, isopropyl acetate, n-butyl acetate, isobutyl acetate or amyl acetate, ketones, e.g. acetone methyl ethyl ketone and saturated hydrocarbons, such as n-hexane, n-heptane or n-octane, are preferably used as suitable organic solvents.

The preparation (Z) according to the present invention may further comprise at least one emulsifier. Component (5) is to be used in particular if the preparation is in the form of a suspension, in particular a dispersion or emulsion. The surfactants ensure the most homogeneous possible distribution of the phases, in particular of the oil phase in the aqueous phase. In particular, non-ionic, cationic or anionic surfactants are used as emulsifiers. Preferred non-ionic, anionic or cationic emulsifiers are ethoxylation products of fatty acids, fatty acid amides, fatty alcohols, fatty amines, the latter also coming in the form of their salts with low molecular weight organic acids or mineral acids, as well as quaternary ammonium compounds such as, for example, cetyl benzyl dimethyl ammonium chloride and preferably ethoxylated octadecyl ammonium chloride. Such emulsifiers are described, for example, in the "Römpp Lexikon Chemie", 10th edition, 2nd volume, pp. 1149 and 1150.

Optionally, the pH value of the preparation is adjusted to a pH value of 3-8 with at least one acid selected from organic acid, such as acetic acid, citric acid, or lactic acid, or mineral acid, such as hydrochloric acid, etc.

Component (5) can be added separately or incorporated into the preparation together with components (1), (2), and optionally (3) and optionally (4). The individual components (1), (2), and optionally (3) are preferably prepared separately using component (5) as a solution or suspension, e.g. dispersion or emulsion, more preferably emulsion, more preferably oil-in-water emulsion, and then formulated to obtain the preparation according to the present invention.

The usual application amounts of component (5) are preferably 0-25 wt %, preferably 1-20 wt %, more preferably 2-15 wt %, based on the total amount of components (1), (2), optionally (3) and (5).

The known methods for forming secondary emulsions are used to prepare the emulsions. Usually, the emulsified temperature is above the melting range of the active ingredients of the used components (1), (2) and optionally (3), preferably between 50 and 80° C. In order to produce emulsions that are as finely divided as possible and particularly stable, a coarsely divided pre-emulsion is often first prepared, the particles of which are then reduced to the necessary average particle size of between 0.1 and 10 μm with the aid of high-pressure homogenizers.

If desired, the inert organic solvents, such as ethyl acetate, n-propyl acetate, i-propyl acetate, n-butyl acetate, i-butyl acetate or amyl acetate, supplied as reaction medium for the preparation of components (2) and optionally (3), can be removed by distillation after emulsification to avoid emitting organic hydrocarbons.

A further subject-matter of the present invention is the use of the preparation according to the present invention and the organopolysiloxane according to the present invention as a water repellent, in particular as a water repellent on sheet materials or fibers, such as textile substrates, linear textiles, such as yarns, twines or ropes, paper, leather and mineral sheet materials.

The preparation or the organopolysiloxane is preferably applied to the sheet materials for hydrophobization with coatings of 0.5-3 wt %, preferably 0.5-2.5 wt %, particularly preferably 0.5-2.0 wt % of the solid substance of the preparation according to the present invention, based on the weight of the sheet material to be treated. Usually, a liquor in the desired concentration is applied by means of forced application of aqueous medium on the foulard with liquor pick-ups of 40-100%, subsequent predrying at 80-110° C. and a subsequent heat treatment at 130-170° C. for 1-5 minutes. In each case, the duration of the heat treatment depends on the temperatures applied.

Fibers in the sense of the present invention are natural fibers, as well as synthetic fibers. Natural fibers are preferably cotton, wool or silk. Synthetic fibers or artificial fibers are produced synthetically from natural or synthetic polymers and are preferably regenerated fibers, polyester, polyolefin, preferably polyethylene or polypropylene, more preferably polypropylene, polyamide, polyaramide, such as Kevlar or Nomex, polyacrylonitrile, spandex or viscose.

A textile in the sense of the invention is made of multiple fibers. Preferably, the textile is linear or sheet-like. "Linear textile" means, for example, a yarn, a twine or a rope. Flat textiles are preferably fleece, felts, woven fabrics, knitted fabrics and braids. According to the present invention, textiles may also include blends of natural fibers and synthetic fibers. Particularly preferred are fabrics made of textile substrates, such as woven fabrics, knitted fabrics, form-strengthened fibers, fleece ("non-woven").

When applied to textile sheet materials, the preparations according to the present invention can also be combined with finishing agents commonly used in the textile industry. Of particular note are agents which improve the detangling properties, for example methylol compounds of dihydroxyethylene urea or methylol melamine ethers of varying degrees of methylolation. Furthermore, finishing agents that improve flame retardancy or impart a preferred haptics to the fabric can be taken into consideration. However, the desired fabric haptics can be achieved solely by the combination of components (1)-(3) according to the present invention, which is why further finishing agents can be dispensed with in these cases.

The fabrics can also be made of paper, which can be produced by the known papermaking methods and from all the base materials customary in this field of application. The preparations according to the present invention can be applied either as an additive to the paper pulp or by application to the surface of the machine-smooth paper by means of coating equipment by the use of roller, doctor blade or air brush coating methods followed by infrared, hot air or cylinder drying.

Leather fabrics are also well suited for finishing with the preparations of the present invention and organopolysiloxanes. If the application is carried out in the finishing processes downstream of the tannery, this can be done by the known application methods or by spraying or impregnating.

The treatment of other sheet materials is also possible. For example, mineral surfaces such as non-glazed tiles, ceramic parts or wall surfaces can be given excellent water repellency by impregnation with the finishing liquor of the invention.

In another embodiment, the preparation according to the present invention or the organopolysiloxane according to the present invention can be used as an additive in paints, coatings or plasters. Typically, the amount of the preparation according to the present invention or the organopolysiloxane is 1-10 wt % of solid substance based on the total composition.

In a further aspect, the invention relates to a method for hydrophobizing substrates, comprising applying the preparation according to the invention or the organopolysiloxane to a substrate, in particular to a sheet material, more preferably to a textile substrate, paper, leather or mineral substrate.

The treatment of the sheet material can be carried out by various methods, e.g. by applying a liquor of the preparation according to the invention or of the organopolysiloxane by spraying, patting, brushing or sponge application, dipping, impregnating, brushing, optionally also in foam form.

In general, applications of 0.5-3 wt %, but preferably 0.5-2.5 wt %, more preferably 0.5-2.0 wt % of the solid substance of the preparation according to the invention or of the organopolysiloxane are used, based on the weight of the sheetlike structure to be treated.

Alternatively, the preparation/organopolysiloxane can be applied to a textile substrate by means of forced application or by the exhaust method.

Furthermore, the preparation/organopolysiloxane can be used for the follow-up treatment of washed textiles.

Many ready-to-wear articles are washed either at home in household washing machines or in industrial washing machines. The latter applies to a large extent to workwear worn by staff of the fire department, police, military and other professions that are frequently outdoors and therefore exposed to the elements. The garments, which are usually oil-, water- and dirt-repellent, lose these properties when washed. Often, therefore, these properties are replenished by follow-up treatment with phobic agents. The preparations according to the present invention can be used for this application.

The treatment of the industrially washed, ready-to-wear articles is carried out in the washing or spin drum by pouring a liquor of the preparations according to the present invention onto the spin-damp washing articles and then drying them in the tumbler. In household washing machines, the finish can be applied by means of the usual follow-up treatment rinse cycle or a metering ball system.

A further subject-matter of the present invention is the application of the preparations according to the present invention as a finish on fabrics, provided that the application from organic solvents is carried out in an impregnation or dipping process.

Many garments are not washed but subjected to cleaning in organic solvents. Similar to the follow-up treatment of washed articles, the hydrophobic properties can also be restored here by freshening with products based on the organopolysiloxanes and preparations according to the present invention.

The treatment of the finished articles cleaned in organic solvents is carried out in the cleaning drum of the dry-cleaning machines by pouring or spraying a liquor of the preparations according to the present invention onto the spin-damp, cleaned articles and then removing the solvents in the tumbler at elevated temperatures. The chemical character of the cleaning agent is irrelevant, i.e. the treatment can be carried out both with modern machines in closed systems with perchloroethylene or with those suitable for treatment with hydrocarbon-based solvents, such as Isopar J.

A further subject-matter of the present invention is the application of the preparations/organopolysiloxanes according to the present invention as a finish on fabrics, provided that the application from organic solvents is carried out by spray methods.

Instead of treating textile fabrics after washing or cleaning processes by applying the preparations/organopolysiloxanes according to the present invention from continuous, aqueous or solvent-containing liquors, the preparations according to the present invention can also be applied by various spray methods for use in the home (consumer care sector). For this purpose, phobic agents formulated in organic solvents and propellants are available from spray cans or by pump mechanisms. Particularly in the field of shoe care, considerable improvements in water repellency and thus wear comfort can be achieved.

DESCRIPTION OF VARIOUS AND PREFERRED EMBODIMENTS

EXAMPLES

The following examples illustrate the present invention. The application of the finishes on textile fabrics was carried out on a laboratory foulard of type LFV 350/2 "RFA" (company Benz, Switzerland) with subsequent drying and hot treatment on a laboratory stenter frame of type TKF 15/M 350 (company Benz, Switzerland). The liquor uptake was determined by weighing the finished test samples before and after application.

The hydrophobic effects were not tested immediately after application, but only after conditioning the substrates in a standard climate (ISO 139) for 24 hours, in order to level out influences on these properties due to overdrying. Application quantities as well as the conditions of the hot treatment are listed together with the phobic effects to be achieved in Tables 3a to 3c.

Water repellency was tested on the textile fabrics by means of a spray test according to AATCC Standard Test Method 22. The AATCC Standard Test Method 22 test is performed by spraying distilled water under controlled conditions onto the textile substrate to be tested and then visually comparing the wetting pattern to images of an evaluation standard listed in the test method. The numerical values given refer to the appearance of the surface after the water has been sprayed on and have the following meaning:

100=No adhesion of water droplets or wetting of the upper surface.
90=Isolated adhesion of water droplets or wetting of the upper surface
80=Wetting of the upper surface at the points of impact of the water
70=Partial wetting of the entire upper surface
50=Complete wetting of the entire upper surface
0=Complete wetting of the entire upper and lower surface (wetting)

In order to test the resistance of the finished fabrics to washing processes, the test samples were washed at 60° C. according to DIN EN ISO 6330:2013 and then dried according to drying method A or F (see Tab. 3a & 3c).

In order to examine the resistance of the hydrophobic finish to abrasion, the water repellency of the samples in the original condition was first determined by means of a spray test (AATCC Standard Test Method 22). Subsequently, the samples were subjected to abrasion testing in accordance with DIN EN ISO 12947-2. For this purpose, the respective samples were clamped in a Martindale test instrument and a knitted fabric with a load of 790 kg (corresponding to a nominal pressure of 12 kPa) was rubbed against the samples for 2000 cycles. After scrubbing, the hydrophobic effect of the samples was again determined by spray test (AATCC Standard Test Method 22) (see Table 3a).

In order to examine the influence of the hydrophobic agents on the flame retardant effect of special fibers, the test samples were tested according to DIN 4102, Part 1 (building material class B2: normally flammable building materials) (see Tab. 3b). For this purpose, the textile is stretched over the flame and it is observed whether the flame tip reaches the measuring mark at a height of 15 cm within 20 s or not (burning time of the flame: 15 s). This test is performed a total of five times each in the warp and weft directions of the textile.

The following commercially available products were used:

Borchi Kat 24: versatile bismuth carboxylate catalyst, IMCD Deutschland GmbH
RUCO-LINK XCR: solids content 25%, aqueous emulsion of an 3,5-dimethylpyrazole blocked polyisocyanates; Rudolf GmbH
Ethoquad HAT/25: Polyoxyethylene(15)(hydrogenated tallow)methylammonium chloride, Julius Hoesch GmbH & Co. KG
Disponil A 1080: fatty alcohol ethoxylate ($C_{12/14}$, 10 EO), solids content 80%, BASF
Arquad $2C_{75}$: Dicocosdimethylammonium chloride in isopropanol, solids content 75%, Julius Hoesch GmbH & Co. KG

Examples for the Preparation of Component (1)

Compound (A):
General Preparation Instruction for Compound (A) of Formula (I), (II), (Ill) and/or (IV)

In a suitably dimensioned three-necked flask equipped with a distillation condenser, adjustable stirrer and internal thermometer, the components (a1, a2 or a3) and (b1) listed in Tables 1a are melted in the quantities in grams indicated there under inert gas and with stirring. The mixture is then heated to the final temperature (T) indicated in Tables 1a and 1b and stirred further until no more reaction water is distilled off and the acid number (SZ) indicated in Tables 1a is reached. If necessary, 0.1% sulfuric acid can be added as a catalyst for the esterification reactions. In the amidation reactions, no addition of catalyst is necessary. The resulting condensation product is poured out and processed into flakes after cooling.

Compound (A):
Special Preparation Instructions for Compound (A) of the Formula (I) and/or (II) Using Alkyl Isocyanates (b2) and Further Processing to Obtain the Reaction Product (S)

In a suitably sized three-neck flask equipped with reflux condenser, controllable stirrer, internal thermometer and dropping funnel, the components (a1) and (b2) listed in Table 1a are added in grams to isopropyl acetate (solvent (LM)). Then, based on the total amount of components, 0.05% 1,4-diazabicylo¬(2,2,2)¬octane is added as catalyst and the mixture is stirred at 80° C. until no NCO band is visible in the IR spectrum.

Subsequently, the amounts in grams of component (IC) indicated in Table 1a are added to the mixture to prepare the reaction product (S) and stirring is continued at 80° C. until no NCO band can be detected in the IR spectrum.

Reaction Products (S) (=Component (1)):
General Preparation Instructions for Reaction Products (S) of a Compound (A) and Non-Blocked or Partially Blocked Di-, Tri- or Polyisocyanates (IC)

In a suitably dimensioned three-neck flask equipped with a reflux condenser, controllable stirrer, internal thermometer and dropping funnel, the components (A) indicated in Tables 1a and 1b and the components (IC) are added to isopropyl acetate (LM) in the amounts in grams indicated there. Then, based on the total amount of components, 0.05% of 1,4-diazabicylo(2,2,2)octane is added as catalyst and the mixture is stirred at 65° C. until no NCO band is visible in the IR spectrum.

Special Preparation Instructions for the Reaction Products (S) Used in Emulsions (E) 3 and 9

For the preparation of emulsion (E) 3 according to Table 1a, a reaction product (S) is used, in the preparation of which (reaction of compound (A) with isocyanate (IC)) the amount in grams of dimethylaminoethanol indicated in Table 1a is still added.

For the preparation of emulsion (E) 9 according to Table 1a, a reaction product (S) is used, in the preparation of which (reaction of compound (A) with the isocyanate (IC)) the amount in grams of bisoctadecylamine indicated in Table 1a is also added.

Emulsions (E):
General Preparation Instructions for Emulsions (E) from Component (1) or the Reaction Products (S) and Component (2)

Oily phase: The amounts in grams of reaction product (S), present in the above-mentioned isopropyl acetate, and component (2) given in Table 1a are placed in a suitably dimensioned beaker and heated to 65-70° C. with stirring until a clear, homogeneous solution is obtained. The reaction product (S) to be used may have to be melted at 65-70° C. before use to obtain a homogeneous product.

Aqueous phase: In a suitably sized beaker, dissolve the amounts in grams of emulsifier (Em) (=component (5)) indicated in Tables 1a in the indicated amount of water at 65° C.

The two phases are stirred under a high-speed stirrer to form a coarse pre-emulsion, which is then homogenized at 65° C. on the high-pressure homogenizer at 300-500 bar until an average particle size of between 0.1 and 10 micrometers is achieved. Subsequently, the solvent (LM) is removed on the rotary evaporator in vacuum by azeotropic distillation. If necessary, the pH of the obtained emulsion is adjusted to 5-7 with acetic acid 60%, the obtained white emulsion is filtered through a 20 micron filter and adjusted with water to a solids content of 25%.

Examples for the Preparation of Component (2)

Organopolysiloxane (2-1)

11.1 g (0.13 mol) of an amino group-containing organopolysiloxane (I) are mixed with 49.7 g of isopropyl acetate under nitrogen atmosphere. In this mixture, 0.06 g of Borchi catalyst is dissolved under stirring. Then 39.1 g (0.13 mol) of stearyl isocyanate is added in portions so that the exotherm can be well managed. After the exotherm has subsided, the reaction mixture is heated to 80° C. for another 2 h. When no more isocyanate is detectable (IR), the reaction mixture is cooled. 94.3 g of a compound is obtained which no longer contains protonatable basic nitrogen. The compound is used to prepare emulsions (E) 1, 4 & 7 in Table 1a.

Amino group-containing organopolysiloxane (I):

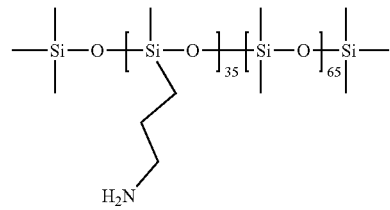

Organopolysiloxane (2-2)

12.4 g (0.13 mol) of an amino group-containing organopolysiloxane (II) are mixed with 49.0 g of isopropyl acetate under nitrogen atmosphere. In this mixture, 0.06 g of Borchi catalyst is dissolved under stirring. Then 38.5 g (0.130 mol) of stearyl isocyanate is added in portions so that the exotherm can be well managed. After the exotherm has subsided, the reaction mixture is heated to 80° C. for another 2 h. When no more isocyanate is detectable (IR), the reaction mixture is cooled. 92.8 g of a compound is obtained which no longer contains protonatable basic nitrogen. The compound is used to prepare emulsions (E) 2, 5 & 9 in Table 1a.

Amino group-containing organopolysiloxane (II):

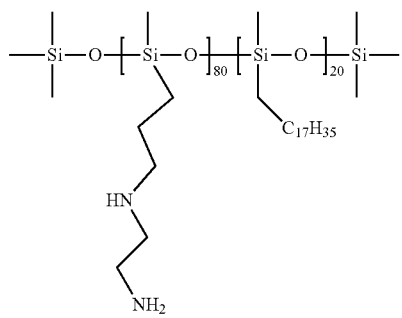

Organopolysiloxane (2-3)

16.6 g (0.12 mol) of an amino group-containing organopolysiloxane (Ill) are mixed with 52.5 g of isopropyl acetate under nitrogen atmosphere. In this mixture, 0.07 g of Borchi catalyst is dissolved under stirring. Then 30.9 g (0.10 mol) of stearyl isocyanate is added in portions so that the exotherm can be well managed. After the exotherm has subsided, the reaction mixture is heated to 80° C. for another 2 h. When no more isocyanate is detectable (IR), the reaction mixture is cooled. 96.7 g of a compound containing 0.54 wt % protonatable basic nitrogen is obtained. The compound is used to prepare emulsions (E) 3, 6 & 8 in Table 1a.

Amino group-containing organopolysiloxane (Ill):

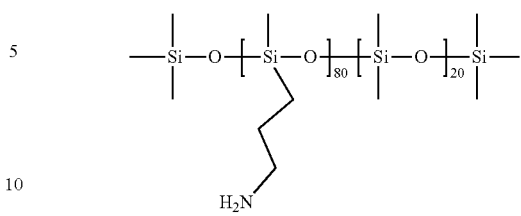

Preparation of the Preparations (Z) According to the Present Invention

The emulsions (E) listed in Table 2a, containing components (1), (2) and (5), are optionally mixed with component (3) and optionally with water in the specified weight ratios to give the preparations (Z) listed in Table 2a.

The preparations Z 19-Z 20 (not according to the present invention) as described in Table 2b were prepared with emulsions from patents WO 2008/135208 A1 (composition according to example 5 of Table ha) instead of the emulsions with component (2) and are for comparison reasons only.

Finishing Examples

Application of Water-Based Preparations (Z) on Textile Fabrics:

Conditions of equipment and test results are shown in Tables 3a, 3b and 3c.

TABLE 1a (according to the present invention):
Production of component (1) and component (2) as well as their emulsions (E)

| | | | Components | Quantities in grams | | | | | | | | |
|---|---|---|---|---|---|---|---|---|---|---|---|---|
| | | | | 1 | 2 | 3 | 4 | 5 | 6 | 7 | 8 | 9 |
| Compound (A) (=precursor of (a) and (b) for reaction product(S)) | (a) | (a1) | Glycerol | 81.0 | 81.0 | 81.0 | | | | | | |
| | | (a2) | Triethanolamine | | | | 131.1 | 131.1 | 131.1 | | | |
| | | (a3) | Bis(aminoethyl) amine | | | | | | | 90.6 | 90.6 | 90.6 |
| | (b) | (b1) | Lauric acid | | | | | | | 352.0 | | |
| | | | Palmitic acid | | 450.6 | 450.6 | | | | | | |
| | | | Stearic acid | | | | 499.8 | 499.8 | | | | |
| | | | Behenic acid | | | | | | | | 598.4 | 598.4 |
| | | (b2) | Stearyl isocyanate | 520.1 | | | | | | | 520.1 | |
| | | | Final temperature (T) in ° C. | 90 | 160 | 160 | 165 | 165 | 160 | 165 | 90 | 160 |
| | | | Acid number (SZ) | | <5 | <5 | <10 | <10 | <5 | <5 | | <5 |
| Reaction Product (S) (=comp. (1)) | | | component (A) | 108.2 | 137.3 | 137.3 | 124.1 | 124.1 | 117.9 | 99.4 | 112.6 | 99.4 |
| | | | Bis (octadecyl) amine | | | | | | | | | 9.2 |
| | | | Dimethyl amino ethanol | | | | 4.8 | | | | | |
| | | | Isocyanate (IC) | | | | | | | | | |
| | | | 2,4-Toluylendiisocyanate/ Trimethylol-propanurethane with 13.5 wt.-% NCO | 49.5 | | | 56.9 | | | 39.4 | | 36.1 |
| | | | Hexamethylendiisocyanate trimer having 21.7 wt.-% NCO | | 46.7 | 36.4 | | 35.3 | 41.5 | | 31.4 | |
| | | Solvent (LM) | Isopropylacetate | 158 | 184 | 179 | 181 | 159 | 162 | 141 | 144 | 145 |
| Emulsion (E) comprising components (1), (2), (4) and (5) | Reaction product (S) | | | 88.0 | 133.8 | 133.8 | 109.1 | 109.1 | 109.1 | 99.4 | 99.4 | 99.4 |
| | Cpomponent (2) | | Organopolysiloxane (2-1) | 29.0 | | | 35.2 | | | 50.2 | | |
| | Alkylurea-functionalized organopolysiloxane | | Organopolysiloxane (2-2) | | 66.9 | | | 35.2 | | | | 50.2 |
| | | | Organopolysiloxane (2-3) | | | 66.9 | | | 35.2 | | 50.2 | |

TABLE 1a-continued (according to the present invention):
Production of component (1) and component (2) as well as their emulsions (E)

| | Components | \multicolumn{9}{c}{Quantities in grams} | | | | | | | | |
|---|---|---|---|---|---|---|---|---|---|---|
| | | 1 | 2 | 3 | 4 | 5 | 6 | 7 | 8 | 9 |
| Component (5) emulsifier (Em) | Ethoquad HT 25 | 0.2 | 0.5 | 0.5 | 0.3 | 0.3 | 0.3 | 0.4 | 0.4 | 0.4 |
| | Disponil A 1080 | 1.9 | 3.8 | 3.8 | 2.4 | 2.4 | 2.4 | 2.4 | 2.4 | 2.4 |
| | Arquad 2C75 | 1.6 | 3.5 | 3.5 | 2.4 | 2.4 | 2.4 | 2.5 | 2.5 | 2.5 |
| water (4) | | 229.7 | 401.3 | 401.3 | 269.3 | 269.3 | 269.3 | 300.1 | 300.1 | 300.1 |
| Acetic acid 60% | | 0.3 | 0.4 | 0.4 | 0.4 | 0.4 | 0.4 | 0.4 | 0.4 | 0.4 |

TABLE 2a

Mixing ratios of the preparations according to the invention (Z)

| Parts by weight of emulsion (E) containing components (1), (2), (4) and (5) | Parts by weight of component (3) RUCO-LINK XCR | Parts by weight water | Preparation (Z) |
|---|---|---|---|
| 80 of (E) 1 | — | 20 | 1 according to the present invention |
| 80 of (E) 1 | 20 | — | 2 according to the present invention |
| 80 of (E) 2 | — | 20 | 3 according to the present invention |
| 80 of (E) 2 | 20 | — | 4 according to the present invention |
| 80 of (E) 3 | — | 20 | 5 according to the present invention |
| 80 of (E) 3 | 20 | — | 6 according to the present invention |
| 80 of (E) 4 | — | 20 | 7 according to the present invention |
| 80 of (E) 4 | 20 | — | 8 according to the present invention |
| 80 of (E) 5 | — | 20 | 9 according to the present invention |
| 80 of (E) 5 | 20 | — | 10 according to the present invention |
| 80 of (E) 6 | — | 20 | 11 according to the present invention |
| 80 of (E) 6 | 20 | — | 12 according to the present invention |
| 80 of (E) 7 | — | 20 | 13 according to the present invention |
| 80 of (E) 7 | 20 | — | 14 according to the present invention |
| 80 of (E) 8 | — | 20 | 15 according to the present invention |
| 80 of (E) 8 | 20 | — | 16 according to the present invention |
| 80 of (E) 9 | — | 20 | 17 according to the present invention |
| 80 of (E) 9 | 20 | — | 18 according to the present invention |

TABLE 2b

Preparations not according to the present invention (Z)

| Products | Parts by weight of component (3) RUCO-LINK XCR | Parts by weight water | Preparation (Z) |
|---|---|---|---|
| 80 Example 5 of WO 2008/135208 A1 | — | 20 | 19 (not according to the invention) |
| 80 Example 5 of WO 2008/135208 A1 | 20 | — | 20 (not according to the invention) |

TABLE 3a

Forced application on polyester fabric, 105 g/m²
Finishing results
Application quantity of preparation (Z): 30 g/l in water
Liquor pick-up: 70%
Drying and condensation: 2 minutes at 170° C.

| | Preparation (Z) According to Tab. 2a/2b | \multicolumn{10}{c}{According to the present invention} | | | | | | | | | |
|---|---|---|---|---|---|---|---|---|---|---|---|
| | | 1 | 2 | 3 | 4 | 5 | 6 | 7 | 8 | 9 | 10 |
| Original | AATCC Standard Test Method 22 | 100 | 100 | 100 | 100 | 100 | 100 | 100 | 100 | 100 | 100 |

TABLE 3a-continued

| | | | | | | | | | | | |
|---|---|---|---|---|---|---|---|---|---|---|---|
| After 3 × 60° C. washes * | AATCC Standard Test Method 22 | 100 | 100 | 100 | 90 | 100 | 100 | 100 | 100 | 100 | 100 |
| After 5 × 60° C. washes * | AATCC Standard Test Method 22 | 90 | 90 | 90 | 100 | 90 | 100 | 90 | 90 | 90 | 100 |
| After 10 × 60° C. washes * | AATCC Standard Test Method 22 | 90 | 90 | 80 | 90 | 90 | 90 | 90 | 90 | 80 | 90 |
| Abrasion resistance ** 2000 tours | AATCC Standard Test Method 22 | 100 | 90 | 90 | 90 | 100 | 100 | 90 | 100 | 90 | 90 |

| | Preparation (Z) According to Tab. 2a/2b | According to the present invention | | | | | | | | Not according to the present invention | |
|---|---|---|---|---|---|---|---|---|---|---|---|
| | | 11 | 12 | 13 | 14 | 15 | 16 | 17 | 18 | 19 | 20 |
| Original | AATCC Standard Test Method 22 | 100 | 100 | 100 | 100 | 100 | 100 | 100 | 100 | 100 | 100 |
| After 3 × 60° C. washes * | AATCC Standard Test Method 22 | 90 | 100 | 100 | 100 | 100 | 100 | 100 | 100 | 80 | 90 |
| After 5 × 60° C. washes * | AATCC Standard Test Method 22 | 90 | 100 | 90 | 100 | 90 | 100 | 90 | 90 | 70 | 70 |
| After 10 × 60° C. washes * | AATCC Standard Test Method 22 | 80 | 90 | 80 | 90 | 90 | 90 | 80 | 90 | 50 | 70 |
| Abrasion resistance ** 2000 tours | AATCC Standard Test Method 22 | 100 | 100 | 100 | 90 | 80 | 90 | 90 | 100 | 70 | 80 |

* according to EN ISO 6330: 2000; drying method A in standard climate standard climate (20° C., humidity 65%) (ISO 139)
** cf. description on p. 24 et seq.

TABLE 3b

Forced application on Trevira CS fiber, 195 g/m²
Finishing results
application quantity of preparation (Z): 30 g/l in water
Liquor pick-up: 70%
Drying and condensation: 2 minutes at 170° C.

| | Preparation (Z) according to table 2a/2b | According to the present invention | | | | | | | | | |
|---|---|---|---|---|---|---|---|---|---|---|---|
| | | 1 | | 2 | | 3 | | 4 | | 5 | |
| Burning behavior according to DIN 4102, Part 1* | Fabric direction | warp | weft | warp | weft | warp | weft | warp | weft | warp | weft |
| | Total burn time [s] | 2 | 5 | 12 | 8 | 10 | 24 | 7 | 4 | 20 | 23 |
| | Does the flame peak reach the measuring mark before the end of the 20s? [y = yes/n = no] | n | n | n | n | n | y | n | n | n | n |

| | Preparation (Z) according to table 2a/2b | According to the present invention | | | | | | | | | |
|---|---|---|---|---|---|---|---|---|---|---|---|
| | | 6 | | 7 | | 8 | | 9 | | 10 | |
| Burning behavior according | Fabric direction | warp | weft | warp | weft | warp | weft | warp | weft | warp | weft |
| | Total burn time [s] | 28 | 18 | 13 | 22 | 3 | 5 | 8 | 12 | 27 | 20 |
| | Does the flame | y | n | n | y | n | n | n | n | y | n |

TABLE 3b-continued

| to DIN 4102, Part 1* | peak reach the measuring mark before the end of the 20s? [y = yes/n = no] | | | | | | | | | | |
|---|---|---|---|---|---|---|---|---|---|---|---|

| Preparation (Z) according to table 2a/2b | | According to the present invention | | | | | | | | | |
|---|---|---|---|---|---|---|---|---|---|---|---|
| | | 11 | | 12 | | 13 | | 14 | | 15 | |
| Burning behavior according to DIN 4102, Part 1* | Fabric direction | warp | weft | warp | weft | warp | weft | warp | weft | warp | weft |
| | Total burn time [s] | 8 | 7 | 15 | 22 | 7 | 10 | 26 | 21 | 16 | 27 |
| | Does the flame peak reach the Measuring mark before the end of the 20s? [y = yes/n = no] | n | n | n | n | n | n | y | n | n | y |

| Preparation (Z) according to table 2a/2b | | According to the present invention | | | | | | Not according to the present invention | | | |
|---|---|---|---|---|---|---|---|---|---|---|---|
| | | 16 | | 17 | | 18 | | 19 | | 20 | |
| Burning behavior according to DIN 4102, Part 1* | Fabric direction | warp | weft | warp | weft | warp | weft | warp | weft | warp | weft |
| | Total burn time [s] | 4 | 18 | 25 | 23 | 2 | 9 | 37 | 56 | 46 | 32 |
| | Does the flame peak reach the Measuring mark before the end of the 20s? [y = yes/n = no] | n | n | n | n | n | n | y | y | y | n |

*Building material class B2: normally flammable building materials

TABLE 3c

Forced application on cotton, 175 g/m²
Finishing results
Application quantity of preparation (Z): 40 g/l in water
Liquor pick-up: 80%

| | | According to the present invention | | | | | | | | | |
|---|---|---|---|---|---|---|---|---|---|---|---|
| | P | 1 | 2 | 3 | 4 | 5 | 6 | 7 | 8 | 9 | 10 |
| A | M | 100 | 100 | 100 | 100 | 100 | 100 | 100 | 100 | 100 | 100 |
| B* | M | 90 | 100 | 100 | 100 | 100 | 100 | 90 | 100 | 90 | 100 |
| C* | M | 90 | 90 | 80 | 90 | 80 | 90 | 90 | 90 | 90 | 90 |
| D* | M | 80 | 90 | 80 | 90 | 70 | 90 | 80 | 90 | 80 | 90 |

| | | According to the present invention | | | | | | | | NATI | |
|---|---|---|---|---|---|---|---|---|---|---|---|
| | P | 11 | 12 | 13 | 14 | 15 | 16 | 17 | 18 | 19 | 20 |
| A | M | 100 | 100 | 100 | 100 | 100 | 100 | 100 | 100 | 100 | 100 |
| B* | M | 100 | 100 | 100 | 100 | 90 | 100 | 90 | 100 | 80 | 90 |
| C* | M | 80 | 80 | 90 | 90 | 90 | 90 | 80 | 90 | 80 | 80 |
| D* | M | 70 | 80 | 80 | 90 | 90 | 90 | 80 | 80 | 50 | 70 |

*according to EN ISO 6330: 2000; Drying method F (tumbler drying (70° C.))
P: Preparation (Z) according to Table 2a/2b
M: AATCC Standard Test Method 22
Row A: Original
Row B: After 5 × 60° C.-washes*
Row C: After 10 × 60° C.-washes*
Row D: After 15 × 60° C.-washes*
NATI: Not according to the present invention The following items are comprised by the present invention:

1. Organopolysiloxane comprising at least one structural unit (i) and/or (vi):

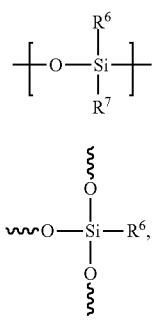
(i)

(vi)
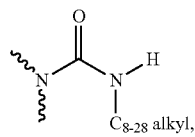

wherein
- $R^6$ independently comprises at least one $C_{8-28}$ alkyl group, preferably $C_{14-20}$ alkyl group, more preferably $C_{16-18}$ alkyl group and at least one urea group, and
- $R^7$ independently is selected from —$CH_3$, —OH and a —$C_{1-5}$ alkoxy group.

2. Organopolysiloxane according to item 1, wherein $R^6$ comprises at least one $C_{8-28}$ alkyl urea group

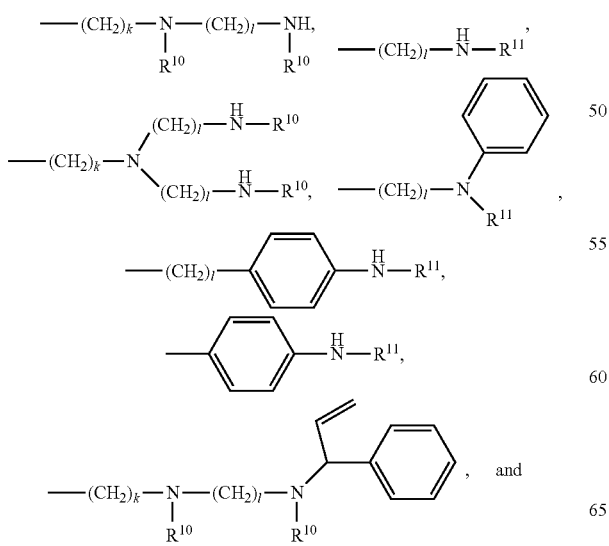

more preferably one $C_{14-20}$ alkyl urea group, more preferably a $C_{16-18}$ alkyl urea group.

3. Organopolysiloxane according to item 1 or 2, wherein $R^6$ is selected from

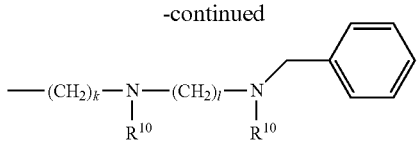

wherein
- $R^{10}$ independently is H or $R^1$,
- $R^{11}$ independently is —C(O)—NH—$C_{8-28}$ alkyl provided that $R^6$ comprises at least one $R^{11}$,
- k is 2-4, preferably 2-3 and
- l is 2-4, preferably 2-3.

4. Organopolysiloxane according to any one of the preceding items, wherein the organopolysiloxane further comprises at least one structural unit selected from

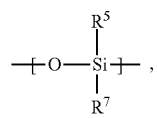
(ii)

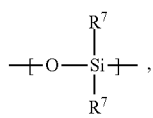
(iii)

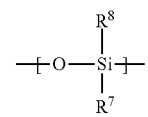
(iv)

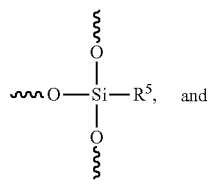
(v)

and

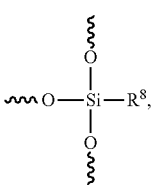
(vii)

wherein
- $R^5$ independently is a $C_{8-28}$ alkyl group, preferably $C_{14-20}$ alkyl group, more preferably $C_{16-18}$ alkyl group,
- $R^8$ is independently selected from

(α)

(β)

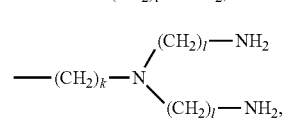
(γ)

-continued

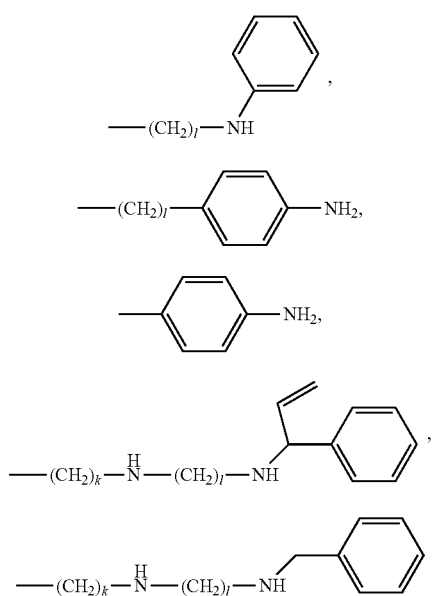

R⁶ and R⁷ are as defined above.

5. Organopolysiloxane according to any one of the preceding items, wherein said organopolysiloxane is independently capped with end groups selected from

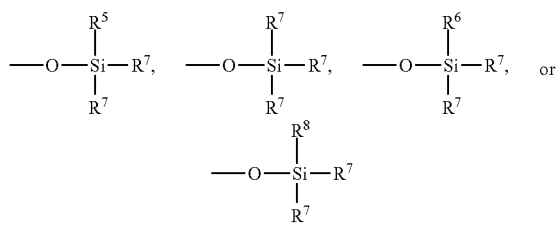

wherein
R⁵, R⁶, R⁷ and R⁸ are as defined above.

6. Organopolysiloxane according to any one of the preceding items, wherein the molar portion of the structural unit (i) is in the range of 25-100 mol-%, preferably 50-100 mol-%.

7. Organopolysiloxane according to any one of the preceding items, wherein the molar portion of the structural unit (vi) is in the range of 25-100 mol-%, preferably 50-100 mol-%.

8. Organopolysiloxane according to any one of the preceding items, wherein the molar portion of the structural unit (ii) is in the range of 0-50 mol-%, preferably 0-30 mol-%.

9. Organopolysiloxane according to any one of the preceding items, wherein the molar portion of the structural unit (iii) is in the range of 0-40 mol-%, preferably 0-20 mol-%.

10. Organopolysiloxane according to any one of the preceding items, wherein the molar portion of the structural unit (iv) and/or (vii) is in the range of 0-20 mol-%, preferably 0-10 mol-%.

11. Organopolysiloxane according to any one of the preceding items, wherein the molar portion of the structural unit (v) is in the range of 0-50 mol-%, preferably 0-30 mol-%.

12. Organopolysiloxane according to any one of the preceding items, wherein the total basic nitrogen content as measured by titration is 0-3 wt %, preferably 0-1.5 wt %, more preferably 0.01-0.5 wt %.

13. Method for preparing an organopolysiloxane according to any one of items 1-13, comprising the steps of
a) providing an organopolysiloxane and/or alkoxysilane having NCO-reactive primary and/or secondary amine groups,
b) reacting the organopolysiloxane and/or alkoxysilane according to a) with $C_{8-28}$ alkyl isocyanate; and
c) optionally hydrolyzing/condensing the alkoxysilane obtained in step b) to the organopolysiloxane.

14. Method according to item 13, wherein the organopolysiloxane according to a) is obtained by equilibration in the presence of or by hydrolysis/condensation of ($C_{1-5}$ alkoxy)silanes having at least one NCO-reactive primary and/or secondary amine group.

15. Method according to item 13, wherein the ($C_{1-5}$ alkoxy)silane having at least one NCO-reactive primary and/or secondary amine group has the structure

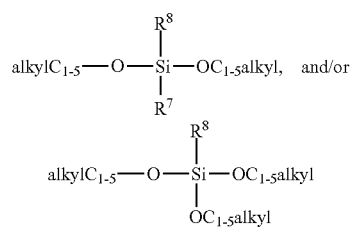

wherein R⁷ and R⁸ are as defined above.

16. Method according to any one of items 14-15, wherein the equilibration is carried out in the presence of an organopolysiloxane comprising structural units (ii), (iii), and/or (v) in the presence of a catalyst and water.

17. Method according to any one of items 13-16, wherein step b) is preferably carried out in the presence of di-n-butyltin dilaurate, tin(II) octoate, dibutyltin diacetate, potassium octoate, zinc dilaurate, bismuth trilaurate or tertiary amines, such as 1,4-diazabicyclo[2,2,2]octane, dimethylcyclohexylamine, dimethylaminopropyldipropanolamine, pentamethyldipropylenetriamine, N-methylimidazole or N-ethylmorpholine, optionally at elevated temperature, e.g. 40 140° C.

18. Organopolysiloxane obtainable by a method according to any one of items 13-17.

19. Composition comprising
(1) at least one reaction product(S) obtainable by reacting at least one compound (A) of

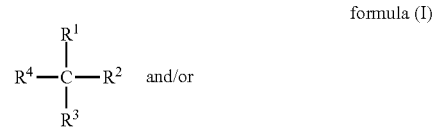

formula (I)

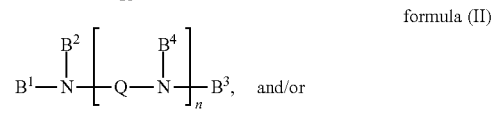

formula (II)

-continued

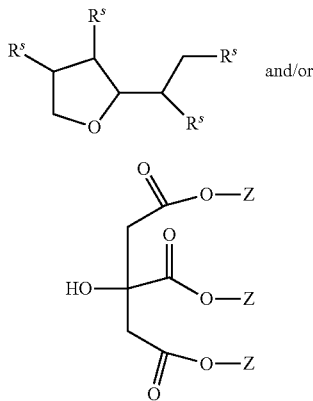
formula (III) and/or

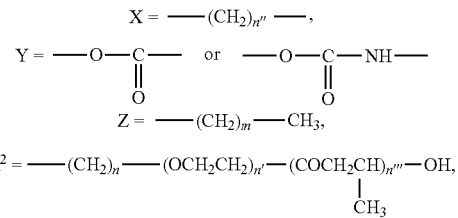
formula (IV)

wherein $R^1 = $ —X—Y—Z or —Z, wherein $X = -(CH_2)_{n''}-$, $Y = -O-\underset{\underset{O}{\|}}{C}-$ or $-O-\underset{\underset{O}{\|}}{C}-NH-$ $Z = -(CH_2)_m-CH_3$, $R^2 = -(CH_2)_n-(OCH_2CH_2)_{n'}-(COCH_2CH)_{n'''}-OH$,
  with $CH_3$ branch $R^3 = $ —X—Y—Z, —Z or —YΣ provided that in case of the meaning of —Y—Z in the residue $R^2$ n is replaced by n",
$R^4 = $ —X—Y—Z or —$(CH_2)_n$·H,
$B^1 = $ —V—W—Z or —Z, wherein

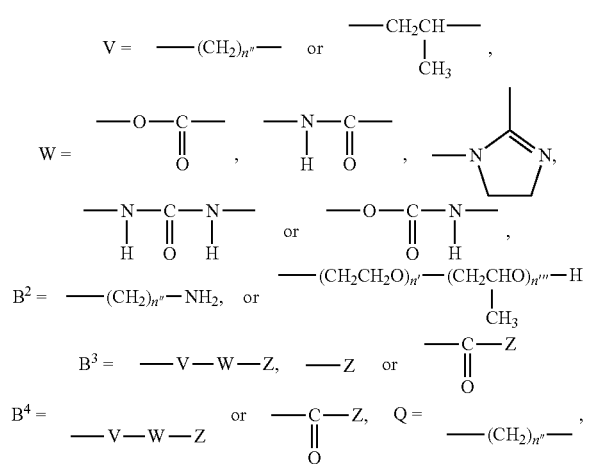

$B^4 = $ —V—W—Z or —$\underset{\underset{O}{\|}}{C}$—Z, $Q = -(CH_2)_{n''}-$, $R^s$ independently from each other is —OH, —YZ,

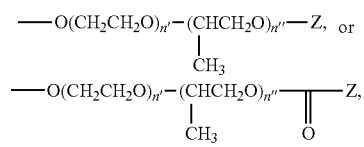

provided that at least one residue $R^s$ in formula (III) is an OH group, and n, n', n", n''' and m independently from each other is an integer, wherein
n=0-2,
n'=0-4,
n"=1-4,
n'''=0-4 and
m=8-30, preferably 12-26, more preferably 14-22,
with at least one non-blocked or at least partially blocked di-, tri- or polyisocyanate (IC), wherein the portion of free isocyanate (NCO) groups in the polyisocyanate (IC) is between 1.8 and 10 per mol (2) at least one organopolysiloxane according to any one of items 1-12 or 18, (3) optionally at least one non-blocked or at least partially blocked di-, tri- or polyisocyanate (IC), (4) optionally at least one liquid medium, in particular water or an organic solvent, and (5) optionally at least one emulsifier.

20. Preparation according to item 19, wherein component (1) constitutes 10-90 wt %, preferably 20-80 wt %, more preferably 25-65 wt %, based on the total mass of components (1) and (2).

21. Preparation according to any one of items 19-20, wherein component (2) constitutes 10-90 wt %, preferably 20-80 wt %, more preferably 30-70 wt %, based on the total mass of components (1) and (2).

22. Preparation according to any one of items 19-21, wherein component (3) constitutes 0-50 wt %, preferably 1-35 wt %, more preferably 5-35 wt %, based on the total mass of components (1), (2) and (3).

23. Preparation according to any one of items 19-22, wherein component (5) constitutes 0-25 wt %, preferably 1-20 wt %, more preferably 2-15 wt %, based on the total mass of components (1), (2), optionally (3) and (5).

24. Preparation according to any one of items 19-23 in the form of a dispersion, preferably in the form of an aqueous dispersion.

25. Preparation according to any one of items 19-24, wherein the solids content of the dispersion is 10-40 wt %, preferably 15-30 wt %.

26. Preparation according to any one of items 19-25, wherein the polyisocyanate (IC) is selected from the group consisting of 2,4-toluylene diisocyanate, 2,4'-diphenylmethane diisocyanate, 4,4'-diphenylmethane diisocyanate (MDI), higher chain homologues of diphenylmethane diisocyanate (polymer MDI), 4-methyl-cyclohexane-1,3-diisocyanate, tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate, dimer diisocyanate, and mixtures such as for example mixtures of MDI and polymeric MDI, and derivatives thereof.

27. Preparation (Z) according to any one of items 19-26, wherein for the reaction product (S) the molar ratio of free isocyanate (NCO) groups in the polyisocyanate (IC) to isocyanate-reactive groups in compound (A) is adjusted to 1:1 to 1:1.3, preferably 1 to 1.1.

28. Preparation (Z) according to item 27, wherein the isocyanate-reactive groups are hydroxy groups, primary and/or secondary amino groups.

29. Preparation (Z) according to any one of items 19-28, wherein the organic solvent according to component (4) is selected from esters, such as ethyl acetate, n-propyl acetate, isopropyl acetate, n-butyl acetate, isobutyl acetate or amyl acetate, ketones, e.g. acetone, methyl ethyl ketone and saturated hydrocarbons, such as n-hexane, n-heptane or n-octane.

30. Preparation according to any one of items 19-29, wherein the emulsifier according to component (5) is selected from anionic, cationic and non-ionic surfactants.
31. Preparation according to any one of items 19-30, wherein the preparation is free of fluorine compounds.
32. Use of the organopolysiloxane according to any one of items 1-12 or 18 or of the preparation according to any one of items 19-31 as a hydrophobing agent.
33. Use according to item 32 as a hydrophobing agent on sheet materials, in particular textile substrates, paper, leather, and mineral sheet materials.
34. Use according to item 33 as an additive in paints, varnishes, or plasters.
35. Method of hydrophobizing substrates, comprising applying the preparation Z according to any one of items 19-31 or the organopolysiloxane according to any one of items 1-12 or 18 to a substrate, preferably a sheet material, more preferably a textile substrate, paper, leather or mineral substrate.
36. Method according to item 35, wherein the application is carried out by means of spraying, dipping, impregnating, brushing or by sponge application.
37. Method according to item 35 or 36, wherein the preparation is applied to a textile substrate by means of forced application or by the exhaust method.

The invention claimed is:
1. Composition comprising
(1) at least one reaction product(S) obtained by reacting at least one compound (A) of

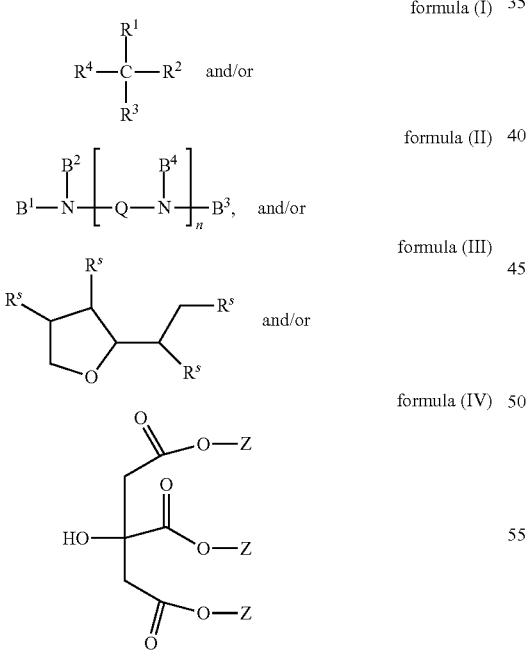

formula (I)

formula (II)

formula (III)

formula (IV)

wherein $R^1$=—X—Y—Z or —Z,
wherein $X = \text{—}(CH_2)_{n''}\text{—}$,

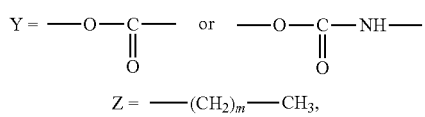

$Z = \text{—}(CH_2)_m\text{—}CH_3$,

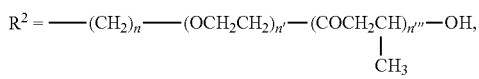

$R^3$=—X—Y—Z, —Z or —Y—Z with the proviso that if $R^3$=—Y—Z, in $R^2$, n is replaced by n'',
$R^4$=—X—Y—Z or —$(CH_2)_n$·H,
$B^1$=—V—W—Z or —Z, wherein

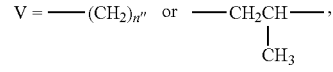

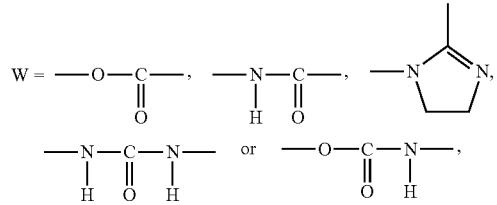

$B^2 = \text{—}(CH_2)_{n''}\text{—}NH_2$, or —$(CH_2CH_2O)_{n'}$—$(CH_2CH_2O)_{n'''}$—H,
        |
        $CH_3$

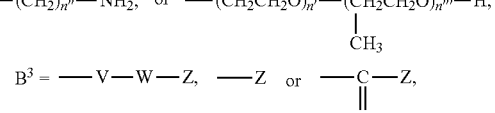

$Q = \text{—}(CH_2)_{n''}\text{—}$, $R^s$ independently from each other is —OH, —YZ,

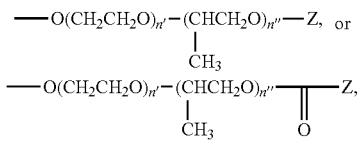

provided that at least one residue $R^s$ in formula (III) is an OH group, and n, n', n'', n''' and m independently from each other is an integer, wherein
n=0-2,
n'=0-4,
n''=1-4,
n'''=0-4 and
m=8-30, with at least one non-blocked or at least one partially blocked di-, tri- or polyisocyanate (IC), wherein the portion of free isocyanate (NCO) groups in the polyisocyanate (IC) is between 1.8 and 10 per mol, wherein the composition is free of fluorine compounds, (2) at least one organopolysiloxane comprising at least one structural unit (i) and/or (vi):

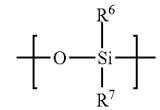 (i)

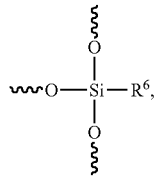 (vi)

wherein
R$^6$ comprises at least one C$_{8-28}$ alkyl group and at least one urea group and is independently selected in (i) and (vi), and
R$^7$ independently is selected from —CH$_3$, —OH and a —C$_{1-5}$ alkoxy group,
(3) optionally at least one non-blocked or at least partially blocked di-, tri- or polyisocyanate (IC),
(4) optionally at least one liquid medium, and
(5) optionally at least one emulsifier.

2. The composition according to claim 1, wherein R$^6$ of the organopolysiloxane comprises at least one C$_{8-28}$ alkyl urea group

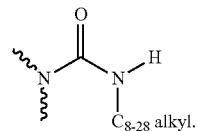

3. The composition according to claim 1, wherein the organopolysiloxane further comprises at least one structural unit selected from

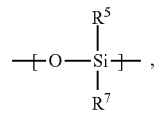 (ii)

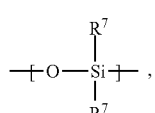 (iii)

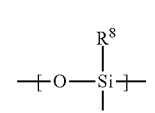 (iv)

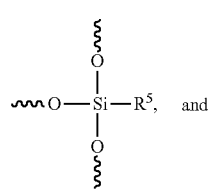 (v)

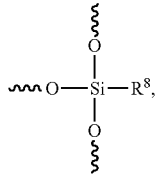 (vii)

wherein
R$^5$ is a C$_{8-28}$ alkyl group,
R$^8$ is independently selected from

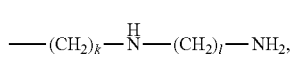 (α)

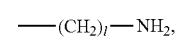 (β)

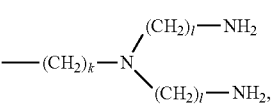 (γ)

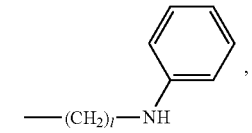 (δ)

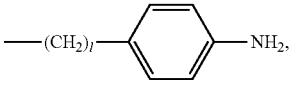 (ε)

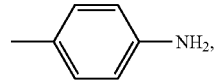 (ζ)

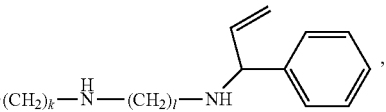 (η)

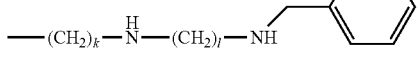 (θ)

and
R$^6$ and R$^7$ are as defined above.

4. The composition according to claim 1, wherein in the at least one organopolysiloxane the molar portion of the structural unit (i) is in the range of 25-100 mol-%, and/or the molar portion of the structural unit (vi) is in the range of 25-100 mol-%, and/or the molar portion of the structural unit (ii) is in the range of 0-50 mol-%, and/or the molar portion of the structural unit (iii) is in the range of 0-40 mol-%, and/or the molar portion of the structural unit (iv) and/or (vii) is in the range of 0-20 mol-%, and/or the molar portion of the structural unit (v) is in the range of 0-50 mol-%.

5. Method for preparing a composition according to claim 1, wherein preparing the organopolysiloxane comprises
a) providing an organopolysiloxane and/or alkoxysilane having NCO-reactive primary and/or secondary amine groups,
b) reacting the organopolysiloxane and/or alkoxysilane according to a) with C$_{8-28}$ alkyl isocyanate; and c) optionally hydrolyzing/condensing the alkoxysilane obtained in b) to the organopolysiloxane.

6. The method according to claim 5, wherein the organopolysiloxane according to a) is obtained by equilibration in presence of or by hydrolysis/condensation of ($C_{1-5}$-alkoxy) silanes having at least one NCO-reactive primary and/or secondary amine group, wherein the ($C_{1-5}$-alkoxy) silane having at least one NCO-reactive primary and/or secondary amine group preferably has the structure

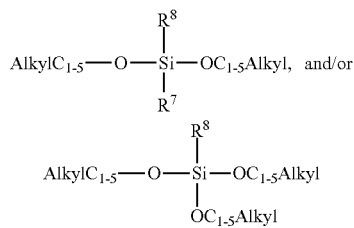

wherein $R^7$ and $R^8$ are as defined above.

7. The composition according to claim 1, wherein component (1) constitutes 10-90 wt %, based on the total mass of components (1) and (2) or component (2) constitutes 10-90 wt %, based on the total mass of components (1) and (2) or component (3) constitutes 0-50 wt %, based on the total mass of components (1), (2) and (3) or component (5) constitutes 0-25 wt %, based on the total mass of components (1), (2), optionally (3) and (5).

8. The composition according to claim 1 in the form of a dispersion, wherein the solids content of the dispersion is 10-40 wt %.

9. The composition according to claim 1, wherein the polyisocyanate (IC) is selected from the group consisting of 2,4-toluylene diisocyanate, 2,4'-diphenylmethane diisocyanate, 4,4'-diphenylmethane diisocyanate (MDI), higher chain homologues of diphenylmethane diisocyanate (polymer MDI), 4-methyl-cyclohexane-1,3-diisocyanate, tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate, dimer diisocyanate, and mixtures thereof.

10. The composition (Z) according to claim 1, wherein for the reaction product(S) the molar ratio of free isocyanate (NCO) groups in the polyisocyanate (IC) to isocyanate-reactive groups in compound (A) is adjusted to 1:1 to 1:1.3, wherein the isocyanate-reactive groups are hydroxy groups, primary and/or secondary amino groups.

11. A method comprising:
providing the composition according to claim 1, wherein the composition is used as a hydrophobing agent on sheet materials or as an additive in paints, varnishes or plasters.

12. Method of hydrophobizing substrates without using fluorocarbon polymers, comprising applying the composition according to claim 1 to a substrate.

13. The method according to claim 12, wherein the applying is carried out via spraying, dipping, impregnating, brushing or by sponge application.

14. The method according to claim 12, wherein the composition is applied to a textile substrate via forced application or by the exhaust method.

15. The composition according to claim 1, wherein the organopolysiloxane is fluorine-free and serves as a hydrophobizing agent for a textile substrate.

16. The composition according to claim 1, wherein the at least one $C_{8-28}$ alkyl group of the organopolysiloxane is a $C_{14-20}$ alkyl group or a $C_{16-18}$ alkyl group.

17. The composition according to claim 2, wherein the at least one $C_{8-28}$ alkyl group of the organopolysiloxane is a $C_{14-20}$ alkyl urea-group or a $C_{16-18}$ alkyl urea group.

18. The composition according to claim 2, wherein $R^6$ of the organopolysiloxane is selected from

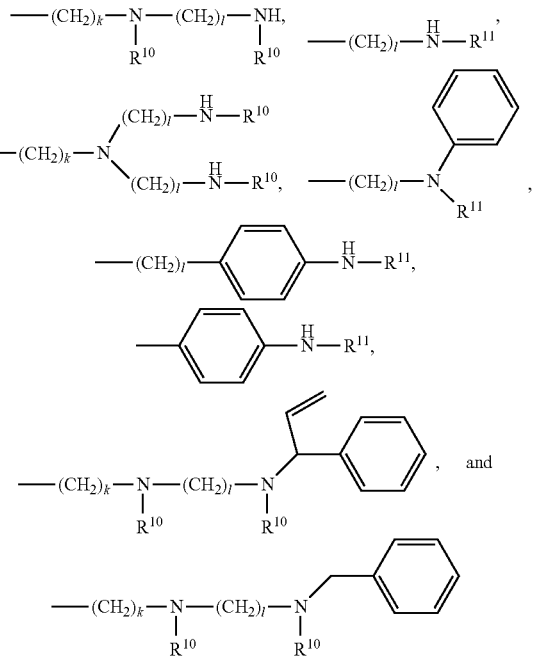

wherein
$R^{10}$ independently is H or $R^{11}$,
$R^{11}$ independently is —C(O)—NH—$C_{8-28}$ alkyl provided that $R^6$ comprises at least one $R^{11}$,
k is 2-4 or 2-3 and
l is 2-4 or 2-3.

19. The method of hydrophobizing substrates according to claim 12, wherein the hydrophobizing agent is fluorine-free, the substrate is a textile substrate and the hydrophobizing of the substrate does not involve fluorocarbon polymers.

20. The composition according to claim 1, wherein the at least one liquid medium in (4) is water or an organic solvent.

21. The composition according to claim 8, wherein the solids content of the dispersion is 15-30 wt %.

22. The composition according to claim 10, wherein for the reaction product(S) the molar ratio of free isocyanate (NCO) groups in the polyisocyanate (IC) to isocyanate-reactive groups in compound (A) is adjusted to 1:1.1.

* * * * *

UNITED STATES PATENT AND TRADEMARK OFFICE
CERTIFICATE OF CORRECTION

PATENT NO. : 12,195,595 B2
APPLICATION NO. : 18/256133
DATED : January 14, 2025
INVENTOR(S) : Albert et al.

It is certified that error appears in the above-identified patent and that said Letters Patent is hereby corrected as shown below:

On the Title Page

Item (72), in Column 1, "Inventors", Line 4, below "Dirk Sielemann, Wolfratshausen (DE)" insert
-- (73) Assignee: Rudolf GmbH, Geretsried (DE) --.

In the Specification

In Column 2, Line 66, delete "$C_8$-28" and insert -- $C_{8-28}$ --, therefor.

In Column 3, Line 10, delete "$C_{16}$-18" and insert -- $C_{16-18}$ --, therefor.

In Column 3, Line 48, delete "$R^{11}$" and insert -- $R^{11}$, --, therefor.

In Column 4, Lines 59-60, delete "(θ)" and insert -- (θ), and --, therefor.

In Column 7, Line 9, delete "product(S)" and insert -- product (S) --, therefor.

In Column 7, Line 55, delete "—$(CH_2)_n$·H," and insert -- —$(CH_2)_n$′H, --, therefor.

In Column 28, Line 9, delete "$R^1$," and insert -- $R^{11}$, --, therefor.

In Column 29, Line 21, delete "(θ)" and insert -- (θ) and --, therefor.

In Column 30, Line 54, delete "product(S)" and insert -- product (S) --, therefor.

In Column 31, Line 32, delete "—YΣ" and insert -- —Y—Z --, therefor.

In Column 31, Line 34, delete "—$(CH_2)_n$·H," and insert -- —$(CH_2)_n$′H, --, therefor.

Signed and Sealed this
Thirteenth Day of May, 2025

Coke Morgan Stewart
*Acting Director of the United States Patent and Trademark Office*

CERTIFICATE OF CORRECTION (continued)
U.S. Pat. No. 12,195,595 B2

In the Claims

In Column 33, in Claim 1, Line 31, delete "product(S)" and insert -- product (S) --, therefor.

In Column 34, in Claim 1, Line 15, delete "—(CH$_2$)$_n$·H," and insert -- —(CH$_2$)$_n'$H, --, therefor.

In Column 34, in Claim 1, Line 30, delete "—(CH$_2$CH$_2$O)$_{n'}$—(CH$_2$CH$_2$O)$_{n'''}$—H, with CH$_3$ branch" and insert -- —(CH$_2$CH$_2$O)$_{n'}$—(CH$_2$CHO)$_{n'''}$—H, with CH$_3$ branch --, therefor.

In Column 37, in Claim 10, Line 47, delete "product(S)" and insert -- product (S) --, therefor.

In Column 38, in Claim 14, Line 3, delete "the exhaust" and insert -- exhaust --, therefor.

In Column 38, in Claim 22, Line 58, delete "product(S)" and insert -- product (S) --, therefor.